United States Patent
Wang (10) Patent No.: US 10,359,914 B2
(45) Date of Patent: Jul. 23, 2019

(54) DYNAMIC DATA SOURCE BINDING (71) Applicant: SAP SE, Walldorf (DE)

(72) Inventor: Yifei Wang, Shanghai (CN)

(73) Assignee: SAP SE, Walldorf (DE)

( * ) Notice: Subject to any disclaimer, the term of this patent is extended or adjusted under 35 U.S.C. 154(b) by 557 days.

(21) Appl. No.: 14/552,699

(22) Filed: Nov. 25, 2014

(65) Prior Publication Data

US 2016/0147903 A1 May 26, 2016

(51) Int. Cl.
G06F 16/951 (2019.01)
G06F 3/0484 (2013.01)
G06F 8/38 (2018.01)
G06F 16/957 (2019.01)

(52) U.S. Cl.
CPC .............. *G06F 3/0484* (2013.01); *G06F 8/38* (2013.01); *G06F 16/9577* (2019.01)

(58) Field of Classification Search
None
See application file for complete search history.

(56) References Cited

U.S. PATENT DOCUMENTS

| 6,771,290 | B1* | 8/2004 | Hoyle ....................... G06F 8/60 715/745 |
| 7,464,386 | B2 | 12/2008 | Millington et al. |
| 7,584,430 | B2 | 9/2009 | Marcos et al. |
| 7,636,895 | B2 | 12/2009 | Gilboa |
| 7,653,880 | B2 | 1/2010 | Peters et al. |
| 7,716,164 | B2 | 5/2010 | Stuhec |
| 7,950,027 | B2 | 5/2011 | Arnquist et al. |
| 8,200,710 | B2 | 6/2012 | Sagi et al. |
| 8,434,097 | B2 | 4/2013 | Brandow et al. |
| 8,561,048 | B2 | 10/2013 | Seeger et al. |
| 8,671,147 | B2 | 3/2014 | Jowett et al. |
| 8,689,174 | B2 | 4/2014 | Shaburov et al. |
| 8,725,949 | B2 | 5/2014 | Kaza et al. |
| 8,762,426 | B2 | 6/2014 | Baudel et al. |
| 2004/0148586 | A1 | 7/2004 | Gilboa |
| 2005/0172261 | A1 | 8/2005 | Yuknewicz et al. |
| 2007/0282743 | A1* | 12/2007 | Lovelett ................. G06Q 20/10 705/40 |
| 2008/0109472 | A1* | 5/2008 | Underwood ........ G06F 17/3089 |
| 2013/0290149 | A1* | 10/2013 | Rashwan ........... G06Q 30/0641 705/27.1 |
| 2014/0122264 | A1* | 5/2014 | Gebhart ................. G06Q 40/10 705/16 |
| 2014/0229270 | A1* | 8/2014 | Rashwan ........... G06Q 30/0641 705/14.43 |

(Continued)

Primary Examiner — Wilson Lee
(74) Attorney, Agent, or Firm — Klarquist Sparkman, LLP (57) ABSTRACT A method for customizing a user interface of a server-side business application on a client device includes querying the server-side business application for information on an available data source in a current context of the business application and for information on a data type of the available data source. The method further involves mapping the data type of the available data source to a user interface (UI) element type and loading an UI element of the mapped UI type in the user interface on the client device. The method includes the server-side business application to retrieve data from the available data source, and displaying the retrieved data via the loaded UI element in the user interface of the business application on the client device.

13 Claims, 9 Drawing Sheets (56) References Cited

U.S. PATENT DOCUMENTS

| | | | |
|---|---|---|---|
| 2014/0237353 A1* | 8/2014 | Pirvu | G06F 17/2264 |
| | | | 715/249 |
| 2014/0337175 A1* | 11/2014 | Katzin | G06Q 20/204 |
| | | | 705/26.62 |
| 2016/0085430 A1* | 3/2016 | Moran | G06F 3/04847 |
| | | | 715/765 |
| 2016/0103856 A1* | 4/2016 | Isaacs | G06F 17/30528 |
| | | | 707/802 |
| 2017/0103050 A9* | 4/2017 | Underwood | G06F 17/2247 |

* cited by examiner

Sales Order

| | | |
|---|---|---|
| Customer | ⇩ C23900 | No. Primär 372 |
| Name | Microchips GmbH | Status Open |
| Contact Person | ⇩ Herbert Mayer | Posting Date 01.03.2013 |
| Customer Ref. No. | | Delivery Date 20.03.2013 |
| Local Currency | ▽ | Document Date 01.03.2013 |

Contents | Logistics | Accounting | Attachments

Ship To ▽
Haupt Lager
Hessische Str. 5
68305 Mannheim GERMANY    [...]

☐ Print Picking Sheet
Language [German ▽]
☐ Procurement Document    [...]
☑ Approved    ← 212
☑ Allow Partial Delivery Bill To ▽
Rechnungsempfänger
Hessische Str. 5
68305 Mannheim GERMANY    [...]

Pick and Pack Remarks
BP Channel Name [German ▽]
BP Channel Contact [German ▽]

Shipping Type
Fedex

⌒ 210

Sales Employee  Kolman Winfried
Owner ⇩ Leitner, Robert

Total Before Discount          1.848,00 EUR
Discount          %
Freight          ⇧
☐ Rounding
Tax          351,12 EUR
Total          2.199,12 EUR Remarks

[ OK ]     [ Cancel ]          [ Copy From ]    [ Copy to ▽ ]

DYNAMIC DATA SOURCE BINDING

BACKGROUND

Business applications are software or computer programs that are used by business users to perform various business functions. The business applications are used to increase productivity, to measure productivity and to perform business functions accurately. Common types of business applications include software applications for accounting, customer relationship management, human resource management systems, outsourcing relationship management, field service software, enterprise resource planning, enterprise resource management (ERM), enterprise content management (ECM), business process management (BPM) and product lifecycle management, etc.

Some business applications are interactive, i.e., they have a graphical user interface or user interface through which users can query, modify or input data. The business applications may generate large amounts of information or data to be displayed, for example, in complex arrangements of forms and UI elements in a user interface on a display screen of a desktop or workstation computer.

While the display screens of desktop and workstation computer may be large enough to accommodate simultaneous display of the large amounts of information or data generated by business applications, modern mobile client devices (e.g., handheld computers, smartphones, etc.) have smaller display screens that may be unable to accommodate all of the large amounts of information or data generated by mobile business applications (e.g., mobile client apps and web based cloud applications). For mobile business applications, the UI layout may be simplified to include only a few UI display elements, for example, to provide better usability and favorable display effects on the smaller display screens. Only selected portions of the large amounts of information or data generated by mobile business applications may be displayed at a time in the simplified UI layouts of the mobile client devices (e.g., handheld computers, smartphones, etc.). Different users may have different needs or expectations of which portions of the large amounts of information or data generated by a mobile business application should be selected for display in the simplified UI layouts of the mobile client devices.

Consideration is now being given to UI layouts for displaying selected portions of the large amounts of information or data generated by mobile business applications. In particular, attention is directed to systems and methods for binding backend business application data sources and front end UI display elements.

SUMMARY

In a general aspect, a method for customizing a user interface of a server-side business application on a client device includes querying, by a client application on the client device, the server-side business application for information on an available data source in a current context of the business application. The queried information includes a data type of the available data source. The method further involves mapping, by the client application, the data type of the available data source to a user interface (UI) element type and loading an UI element of the mapped UI element type in the user interface of the business application on the client device. In a further aspect, the method involves querying the server-side business application to retrieve data from the available data source, and displaying the retrieved data via the loaded UI element in the user interface of the business application on the client device.

The details of one or more implementations are set forth in the accompanying drawings and the description below. Further features of the disclosed subject matter, its nature and various advantages will be more apparent from the accompanying drawings the following detailed description, and the claims.

DETAILED DESCRIPTION

Systems and methods for customizing a user interface (UI) layout on a client computing device for displaying selected portions of data generated by a server-side business application are described herein.

The business application may, for example, be any type of business application (e.g., a software application for accounting, customer relationship management, human resource management systems, outsourcing relationship management, field service software, enterprise resource planning, enterprise resource management (ERM), enterprise content management (ECM), business process management (BPM) and product lifecycle management, etc.). The business application may be hosted on one or more servers in a networked computer system in a server-client configuration. A user may interact with or operate the business application via the client computing device (e.g., a laptop computer, desktop computer, a smartphone, a hand-held computing device, etc.). A backend of the business application (e.g., "server application") may run on the server side to hold and process data, which may be obtained, for example, from one or more server-side databases or other network sources. A front end of the business application (or "client application") may run on the client computing device and provide a user interface of the business application on the client computing device.

The server application may include "data tables," "data structures" or "data sources" (hereinafter "data sources"), which contain data or links to the data processed or generated by the server application. The data sources may include data of any of a variety of data types (e.g., integers, Booleans, characters, floating-point numbers, complex numbers, text, alphanumeric strings, arrays, matrices, combination data types, etc.).

The server application may include access or links to dynamic data sources on the server (i.e. sources containing data which is updated or refreshed during application runtime). The client application (or other user-application) running on the client computing device may be configured to present or display data retrieved from the data sources of the server application on the user interface (e.g., on a display screen) of the client device. Further, non-browser based applications may include static data, which is defined development time. Data from static data sources (e.g., predefined text used with labels and buttons) may be loaded on the user interface during development time, while the data from dynamic data sources (e.g. a field in a database used with edit boxes or combo boxes) may be loaded during runtime.

Figure 1:
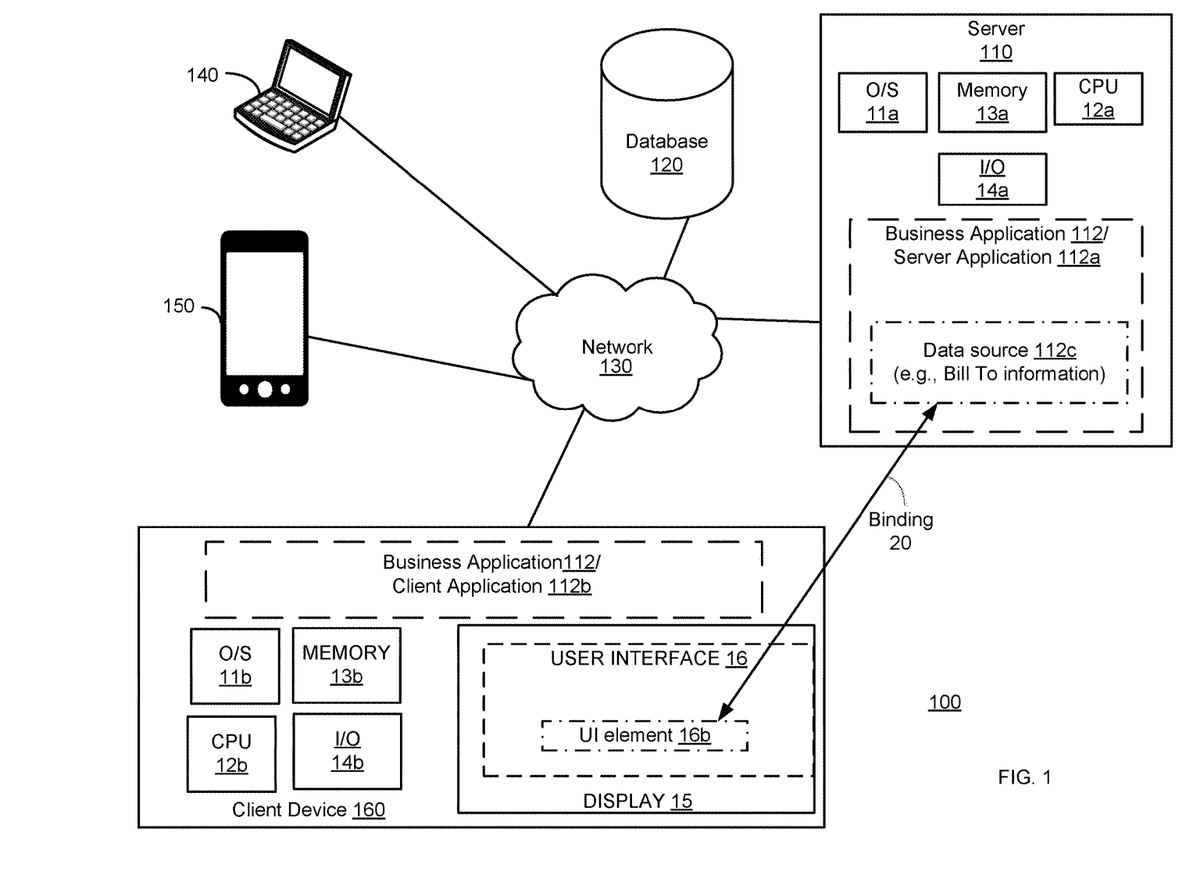
FIG. 1 is a block diagram illustration of an example server-client system in which a business application is deployed, in accordance with the principles of the present disclosure.

FIG. 1 shows, for example, an example server-client system 100 in which a business application 112 may be deployed, in accordance with the principles of the present disclosure. Server-client system 100 may include one or more servers (e.g., server 110) that are networked (via network 130) with one or more client computing devices (e.g., laptop 140, smartphone 150, client device 160, etc.) and databases (e.g., database 130, etc.). A backend of business application 112 (e.g., server application 112a) may be deployed on sever 110, while a frontend of business application 112 (e.g., client application 112b) may be deployed on the client devices (e.g., laptop 140, smartphone 150, client device 160, etc.).

Server 110 and the client computing devices (e.g., laptop 140, smartphone 150, client device 160, etc.) may be microprocessor based computing machines that include semiconductor-based microprocessors, memory, and other computer hardware and software. For example, server 110 may include an O/S 11a, a CPU 12a, a memory 13a, and an I/O 14a. Computing device 160 may, for example, include an O/S 11b, a CPU 12b, a memory 13b, and an I/O 14b. Computing device 160 may further include or be coupled to a display 15 (including, for example, a user interface 16 of business application 112/client application 112b). Computing device 160 may display business application information or data to a user via an arrangement or layout of UI elements on user interface 16.

In general, the UI elements (e.g., UI element 16b) on user interface 16 may be of any type and may include, for example, input controls (e.g. checkboxes, radio buttons, dropdown lists, list boxes, buttons, toggles, text fields, date and time fields); navigational components (e.g., search fields, breadcrumb, sliders, pagination, slider, tags, icons, image carousels, etc.); and informational components (e.g., tooltips, icons, progress bar, notifications, message boxes, modal windows, etc.).

Specific information or data sources of business application 112 may bound to specific UI elements, which may be included in the arrangement or layout of UI elements on user interface 16. In example implementations of business server-client system 100, each data source in business application 112 may be associated with and bound to an UI element of a type capable of displaying data of the data type of the data source. For example, as shown in FIG. 1, data source 112c (e.g., textual billing information) may be bound to UI element 16b capable of displaying textual data using binding 20. Using such binding 20, billing information generated or processed by business application 112 may be displayed as text in UI element 16b on user interface 16. If a data source contains Boolean data (e.g., Yes or No), the data source may be associated with and bound to an UI element of a type (e.g., check box 212, FIG. 2) that is capable of displaying Boolean data.

Business application 112/client application 112b may be configured to present different portions or views of the data retrieved from the different data sources in business application 112/server application 112a that may be relevant to, for example, a current context or state (e.g., processing purchase orders, generating financial reports, etc.) of the business application. Business application 112/client application 112b may, for example, include an arrangement or layout of different UI elements in user interface 16 to display the data retrieved from the different data sources relevant in the context.

Figure 2:
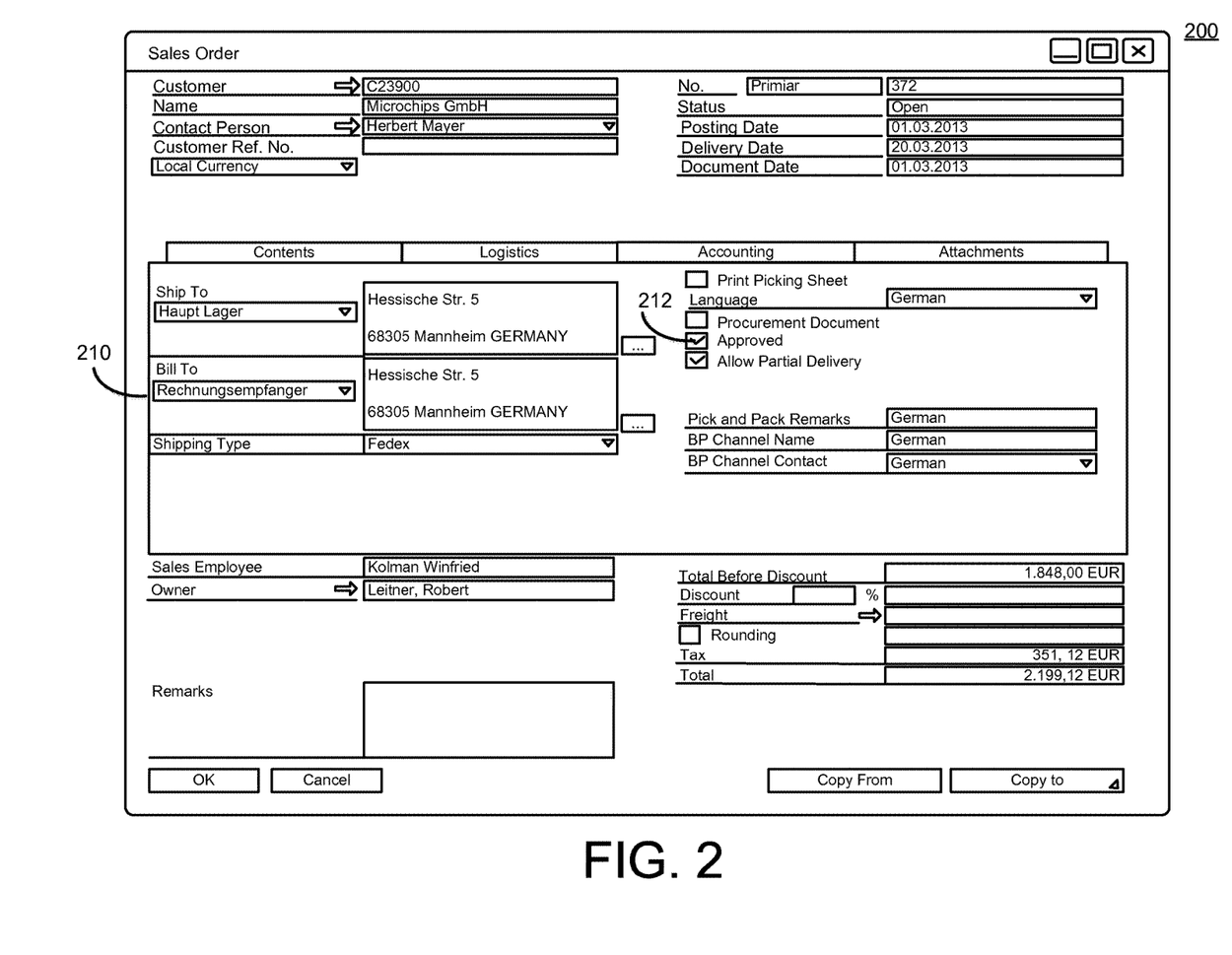
FIG. 2 is an example laptop computer display which includes an extensive arrangement or layout of tens of UI elements to display, for example, logistics data related to a sales order generated or processed by a business application.
Figure 3:
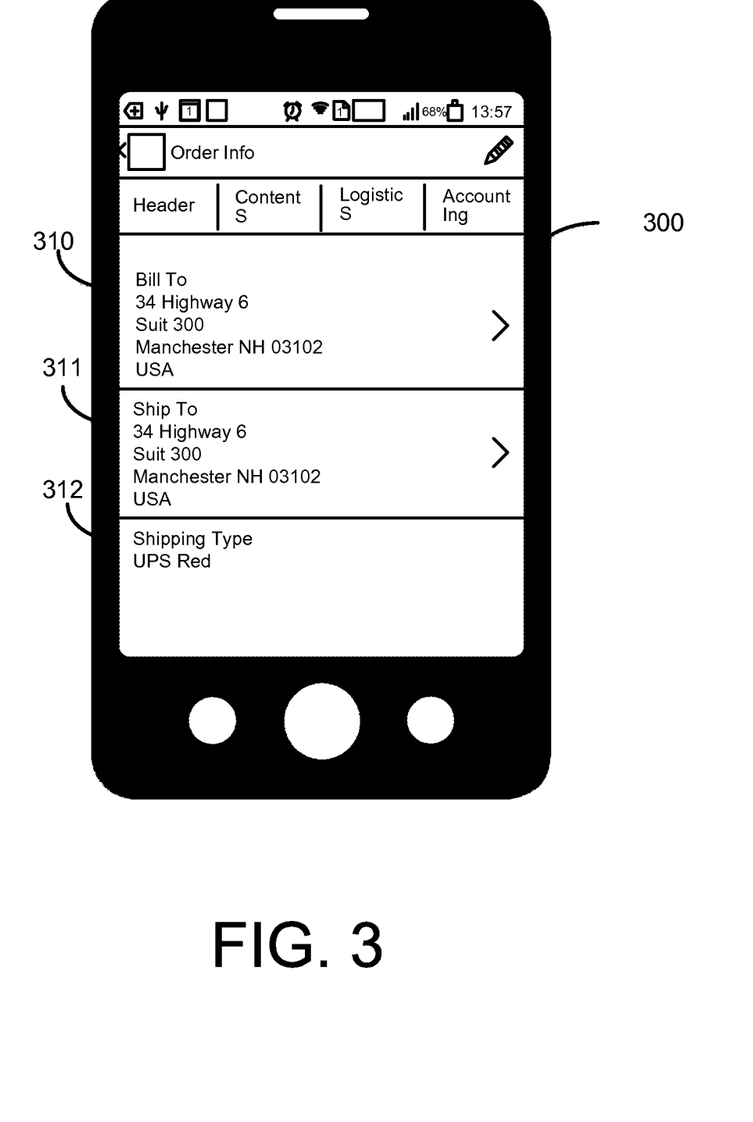
FIG. 3 is an example smart phone display smart phone 150), which includes a limited arrangement or layout of only three UI elements to display portions of the logistics data related to the sales order generated by the business application of FIG. 2.

In practice, the number of UI elements (or the amount of data generated by the server application) which can be displayed on the user interface of the client computing device may be limited by the size of the display screen of the client computing device. FIG. 2 shows, for example, a laptop computer display 200 (e.g., of laptop 140), which includes an extensive arrangement or layout of tens of UI elements (e.g., UI element 210, UI element 212, etc.) to display, for example, logistics data related to a sales order generated or processed by business application 112 (e.g., an ERP business application). In contrast, FIG. 3 shows, for example, a smaller display 300 (e.g., of smart phone 150), which includes a limited arrangement or layout of only three UI elements (e.g., UI element 301-303) to display portions of the logistics data related to the sales order generated by business application 112.

Static Binding Framework for UI Elements

In various implementations of server-client system 100, a server-side data source (e.g., data source 112c) may be either a static data source or a dynamic data sources. However, under a static binding framework for UI elements, the bindings (e.g., binding 20) between client-side UI elements and the server-side data sources are static bindings (regardless of whether the data sources are static or dynamic). The types of the UI elements, the data sources to which the UI elements may be exposed, and the static bindings between the UI elements and the data sources may be established in development time (e.g., when business application 112 is built as an executable program by the developers or coders of business application 112). An UI element on the user interface may express only information of an unchangeable type (e.g., a 'Vendor Name' edit box may display only a vendor name, and a 'Delivered' check box may display only the delivery status of a document, etc.). Because of the static UI element-data source binding, a user may not change the data source bound to the UI element on the user interface (e.g., user interface 16) during runtime, and each data source exposed to the user interface may need to have its own corresponding UI element on the user interface established in development time. Since it may not be possible to change the static bindings between the UI elements and the data sources during runtime, a specific UI element may be used in user interface 16 only to express data from the specific data source to which the UI element is statically bound in development time.

Under the static binding framework, changes to or re-coding of the client application may be needed when the data sources in server 110/server application 112a are changed or modified.

Dynamic Binding Framework for UI Elements

In example implementations of server-client system 100, under "a dynamic binding framework," the bindings (e.g., binding 20) between UI elements and data sources may be dynamic bindings, in accordance with the principles of the disclosure herein.

Under the dynamic binding framework, only UI element types and data types of the data sources may be identified in development time of business application 112 (e.g., by the developers or coders of business application 112). The binding between UI elements (e.g., user element 110) used in user interface 16 and the data sources (e.g., data source 112c) may be user-established only during runtime. The UI element type may have to be compatible with the data type of a corresponding data source to be able to properly express the data in the data source. A user may choose, in runtime, which data sources to display (e.g., based on the user's data needs). The client application may select UI element types that are compatible with the data types of the user-selected data sources and may present corresponding UI elements in user interface 16. The client application may express data from a given data source on user interface 16 by establishing a dynamic binding between an UI element and the given data source.

The dynamic binding framework may provide a user-configurable user interface (e.g., UI 16, 200 and 300 on the client devices 160, 140 and 150, respectively) in which UI elements, at least initially, are not bound (i.e. are detached) from the application data sources. The user may have a choice of configuring or customizing the user interface according to his or her needs (via the client application 112b) by selecting the data sources to be displayed or expressed by the application-selected UI elements on the user-interface. The user may change or modify the layout of the application-selected UI elements on the user interface according to his or her needs. Under the dynamic binding framework, no changes or re-coding of the client application may be needed even when the data sources in server 110/server application 112a are changed or modified on server 110/server application 112a. Thus, software maintenance costs may be mitigated even when the data sources in server 110/server application 112a are changed or modified.

Figure 4:
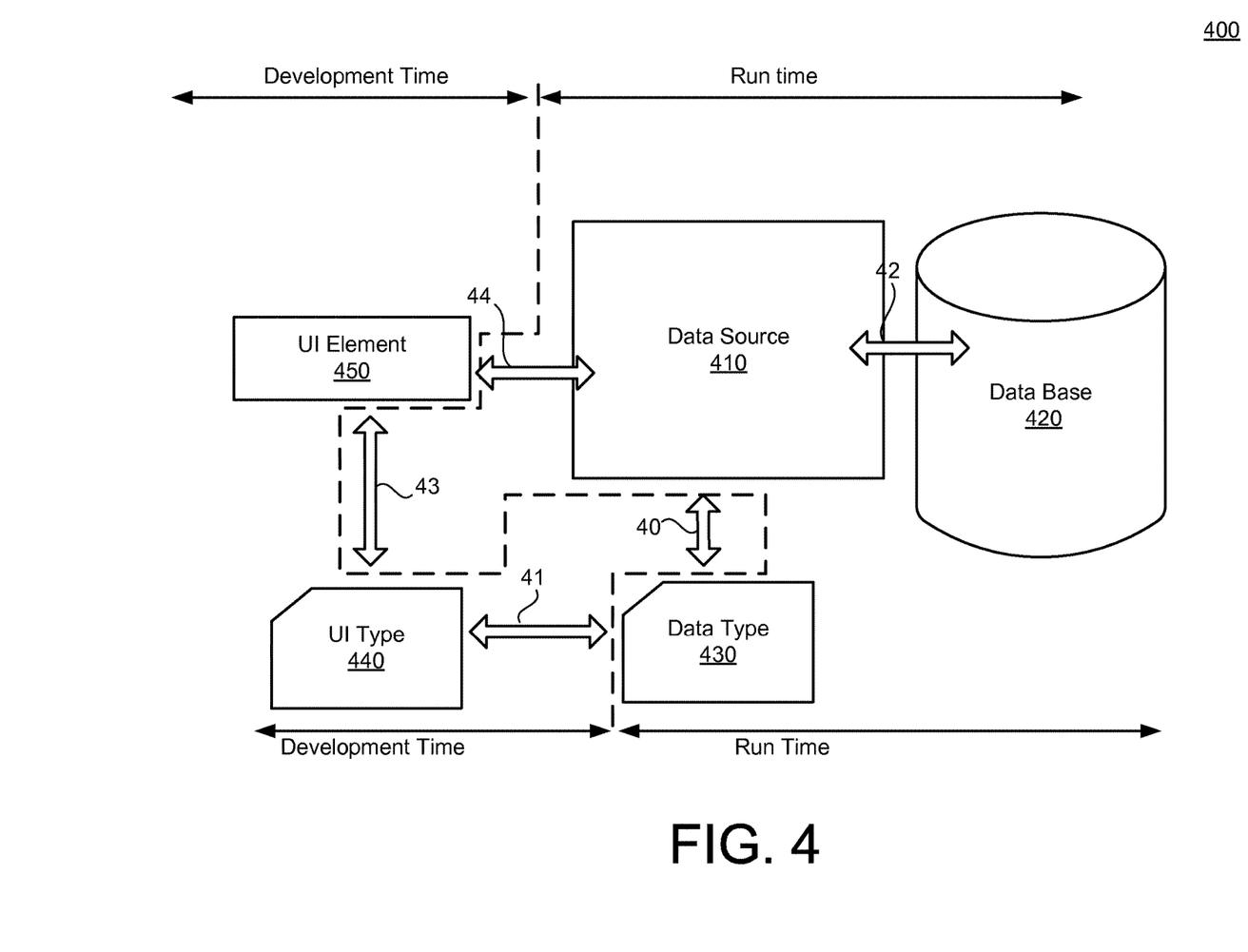
FIG. 4 is a schematic illustration of a division of development time and runtime roles in customizing a business application user interface in a server-client configuration under a dynamic binding framework, in accordance with the principles of the present disclosure.

FIG. 4 schematically shows a division of the development time and runtime roles in customizing a business application user interface in a server-client configuration under a dynamic binding framework 400, in accordance with the principles of the present disclosure.

Under dynamic binding framework 400, a binding (e.g., dynamic binding 44) of client-side UI element (e.g., UI element 450) with a server-side data source (e.g., data source 410) may be established only during runtime. The client application (e.g., client application 112b), in development time, may not include any information on the data types of the specific data sources or the UI element types of the specific UI elements, which the client application may use for a customized business application user interface layout (e.g., for preparing user interface 16, 200 or 300 to display a view or portion of the data generated by business application 112). However, the client application (e.g., client application 112b) may maintain or include a table mapping data types to UI element types. Table I shown below is an example table mapping data types to UI element types, which may be maintained or included in client application 112b.

TABLE I

| Data type | UI element type |
| --- | --- |
| Boolean | Check box, Radio button |
| String with limited valid values | Combo box |
| Freestyle string | Edit box |
| Date/time | Date/time picker |
| Money | Edit box |

Under dynamic binding framework 400, in development time, only a mapping 40 between a server-side data source 410 and a data type 430, and a mapping 41 between data type 430 and a client-side UI element type 440, may be established.

Further, under dynamic binding framework 400, for preparing a user interface (e.g., user interface 16, 200 or 300) to display information or data generated by business application 112, server-side data source 410 (which may include the name of the database, table and field having data for data source 410) may be linked (e.g., via link 42) to the named database (e.g. database 420) in client application runtime. In some implementations, database 420 may be pre-assigned to data source 410 during development time (e.g., for a pre-defined business application use or context). In other implementations, the assignment may occur during runtime (e.g., for flexible business application use or context). In either case, link 42 may be established only during runtime.

Further, in runtime, UI element 450 may be identified (e.g., identification 43) as having UI element type 440 (which maps to data type 430 of the data in data source 410). UI element 450 may be exposed and bound to data source 410 via runtime dynamic binding 44 to display the data in data source 410 on the user interface.

Figure 5:
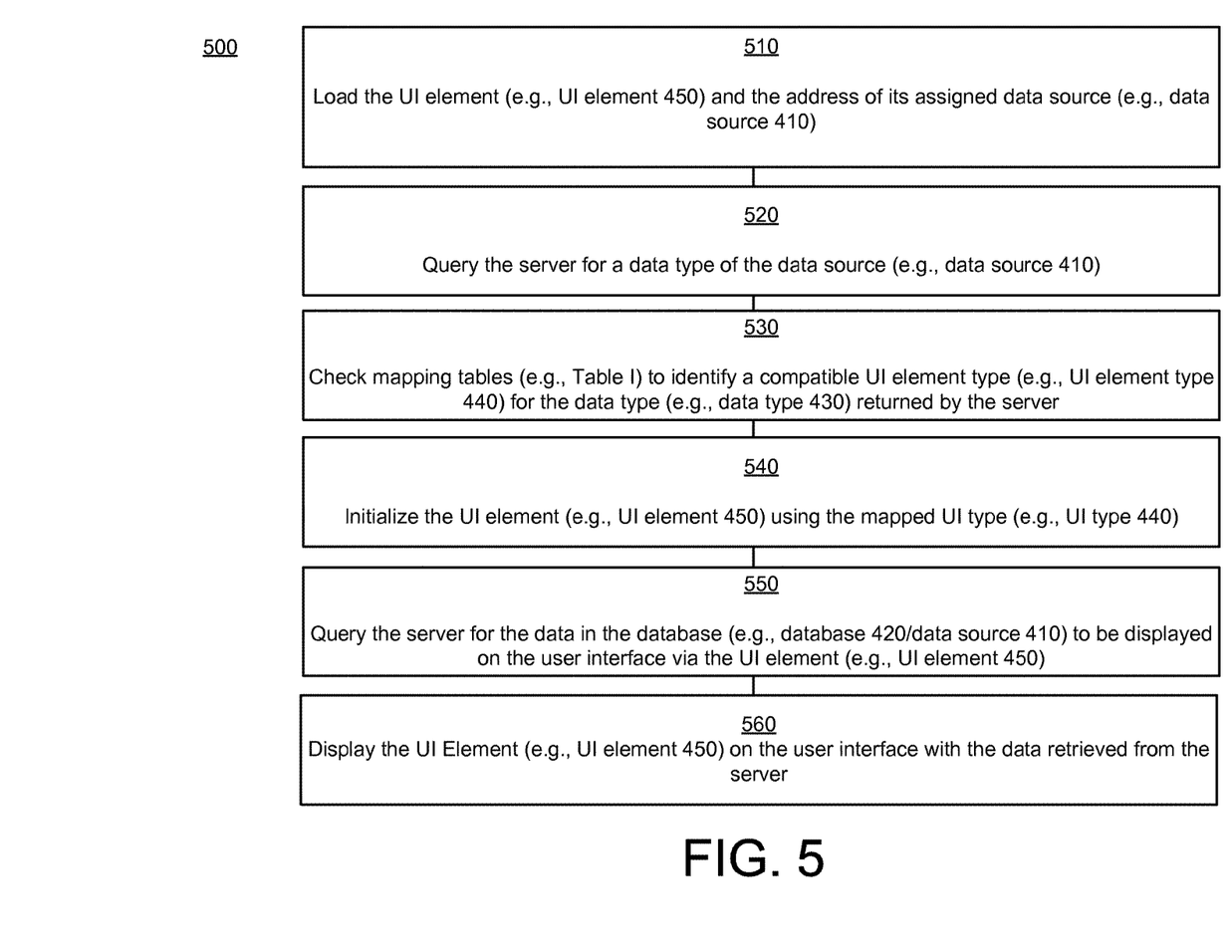
FIG. 5 is a schematic illustration of an example procedure for displaying data contained in a server-side data source on a client device user interface, in accordance with the principles of the disclosure herein.

The display of the data in data source 410 using UI element 450 on the user interface (e.g., user interface 16, 200 or 300) may involve runtime client-server communications, which are illustrated as an example procedure 500 in FIG. 5. For convenience, procedure 500 may be described herein with reference to example client-server system 100 of FIG. 1.

Procedure 500 may include loading the UI element (e.g., UI element 450) and the address of its pre-assigned data source (e.g., data source 410/database 420) (510), and querying server 110 for a data type of the data source (e.g., data source 410) (520). Procedure 500 may further include checking mapping tables (e.g., Table I) in client application 112b to select a compatible UI element type (e.g., UI element type 440) for the data type (e.g., data type 430) returned by the server (530). In some instances, more that one UI element type may be compatible for the data type (e.g., a radio button and a check box may be both compatible for a Boolean data type). In such instances, a default compatible UI element type may be automatically selected and used. Alternatively, a user-selected compatible UI element type may be used Procedure 500 may include initializing the loaded UI element (e.g., UI element 450) using the selected compatible UI element type (540), querying server 110 for the data in the database (e.g., database 420/data source 410) to be displayed on the user interface (550), and displaying the UI element (e.g., UI element 450) on the user interface (e.g., user interface 16, 200 or 300) with the data retrieved from server 110 (560).

It will be noted that in procedure 500, client application 112b may query server 110 twice in runtime—first, to retrieve a data type for the UI element (520), and, second, to retrieve the data to be displayed (550). In some implementations of procedure 500, to improve performance and reduce network load, a batch query process may be used. A single batch query to the server may include requests for data types not only for a current UI element (e.g., UI element 450) but also for other UI elements which may, for example, be used on a same screen view on the user interface. The requested data types may be for data types in the same database table of the data source associated with the current UI element (e.g., UI element 450). The batch query process results may be cached in local memory (e.g., memory 13b) of the client device (e.g., client device 160) for later use by the client application.

Using procedure 500 as described above may dynamically bind the client-side UI element (e.g., UI element 450) and the server-side data source (e.g., data source 410) in runtime. The display of information or data generated by business application 112 on the client application's user interface (e.g., UI 16, 200, or 300) in the case of dynamic binding may be expected to function in a same or similar manner as in the case of static binding of the client-side UI element and the server-side data source.

Customization of the UI Layout Under the Dynamic Binding Framework

Different users of a business application may have different needs or requirements for which data should be displayed on the user interface of the business application. The different needs or requirements may for example, vary by country, industry, user role and/or client device type or size. The different users may have different user interface preferences, for example, to hide or show certain UI elements, and to arrange the positions of UI elements on the user interface according to their importance, frequency of usage, etc.

Under the dynamic binding framework 400, a client application (e.g., client application 112b) may be configured to enable a user to customize or personalize the user interface layout (e.g., UI 16, 200 or 300) individually.

Figure 6:
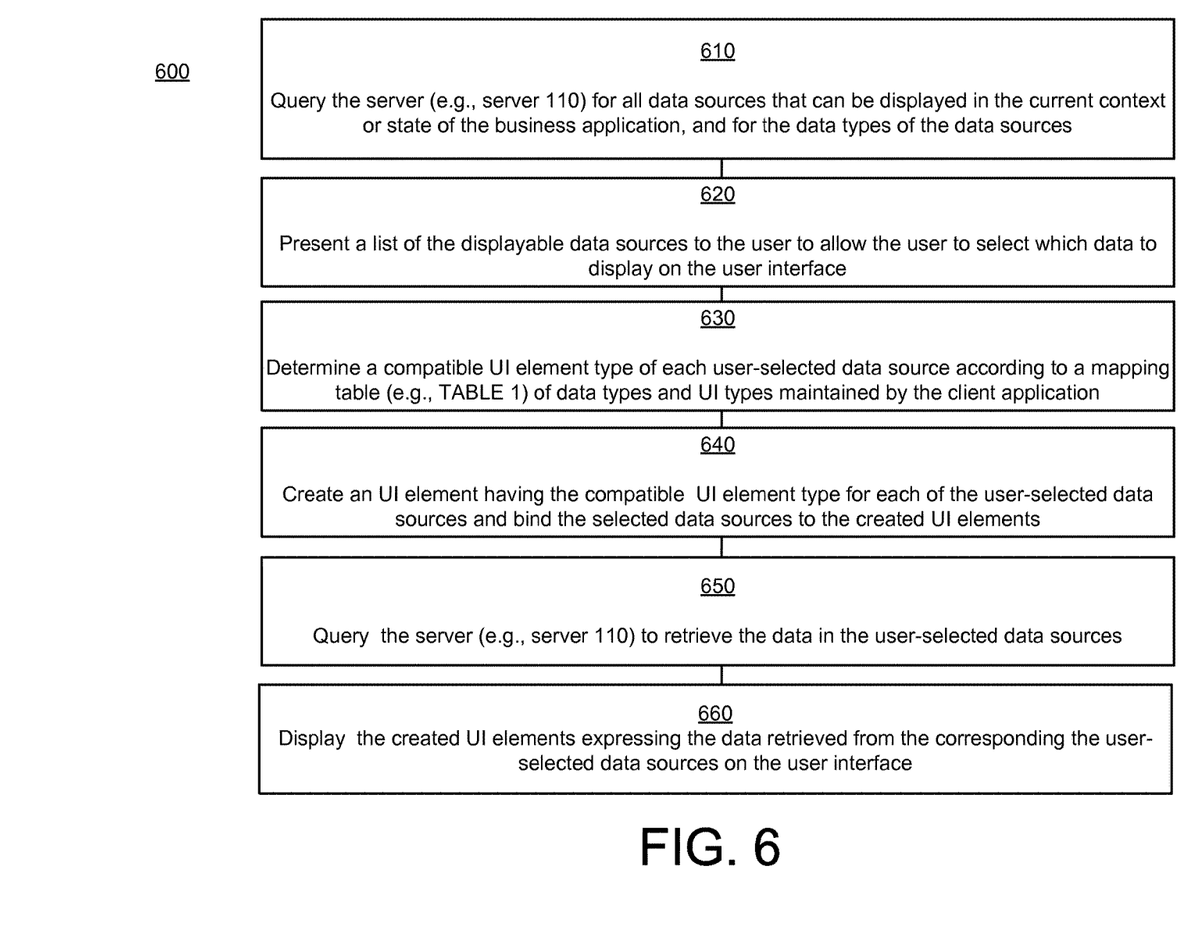
FIG. 6 is an illustration of an example UI customization process performed by client application to allow a user to add specific UI elements to and display data from specific data sources on a business application user interface layout, in accordance with the principles of the present disclosure.

In an example implementation, client application 112b may include an UI customization initiation button or command, activation of which may begin an UI customization process. FIG. 6 shows an example UI customization process 600, which may performed by client application 112b to allow the user to add specific UI elements to and display data from specific data sources on the user interface layout.

In process 600, upon activation of the customization initiation button or command, the client application may query the server (e.g., server 110) for all data sources that can be displayed in a current context or state of the business application, and for the data types of the displayable data sources (610). The client application may present a list of the displayable data sources to allow the user to select which specific data sources to display on the user interface (620). After the user has selected one or more data sources to display on the user interface, the client application may determine a compatible UI element type of each user-selected data source according to a mapping table (e.g., TABLE 1) of data types and UI types maintained by the client application (630). The client application may then create an UI element having compatible UI element type for each of the user-selected data sources and bind the user-selected data sources to the created UI elements (640). Next, the client application may query the server (e.g., server 110) to retrieve the data in the user-selected data sources (650) and display the created UI elements expressing the data retrieved from the corresponding the user-selected data sources on the user interface (660).

In some implementations of process 600, information retrieved from the server (e.g., identification of all data sources that can be displayed) may be cached locally by the client application to reduce network loading and to improve application performance.

Under the dynamic binding framework, the client application need not include all displayable data sources (of business application 112) in a binary executable, but may include only names of the data tables (data sources) that are relevant in the current context or state of business application 112 (e.g., in the context of opening an invoice document, it may be expected that the relevant data may be in 'Invoice', 'Customer', 'Item', and 'Sales Employee' tables). In general, a data table (data source) of the business application may have tens or even hundreds of data fields, and an ERP or other business application system may have hundreds of data tables. In the case of static binding, an extensive and detailed identification of the data sources may, for example, have to be included in the client application. The data source identifications included in the client application may have to include not only the names of data tables but also the names of all data fields in the data tables, their data types and the corresponding statically-bound UI elements. In contrast, dynamic binding of the data sources, as described herein, may permit exclusion of all non-relevant data sources and their corresponding UI elements from the client application. Thus, a size of an executable of the client application and the memory needed to load the executable on a client device can be substantially reduced compared to scenarios which involve static binding of data sources and UI elements.

In some instances, under the dynamic binding framework, developers of a business application may provide predefined UI layouts for the business application, for example, in the context of different industries and user roles. The predefined UI layouts may be a set of configurations of the data sources/UI elements and the position or order in which these data sources/UI elements should be displayed by the business application on the user interface of a client device. The predefined UI layouts may be delivered as scripts (e.g., as XML files), which may be imported into the client application and used for display of business application data on the client computing device. A user may further customize the predefined UI layouts (e.g., using process 600) and save the customized layouts as new layouts. The customized layouts may be exported to or exchanged with other client computing devices to enable quick set up of user interfaces by the other clients of the business application.

Figure 7:
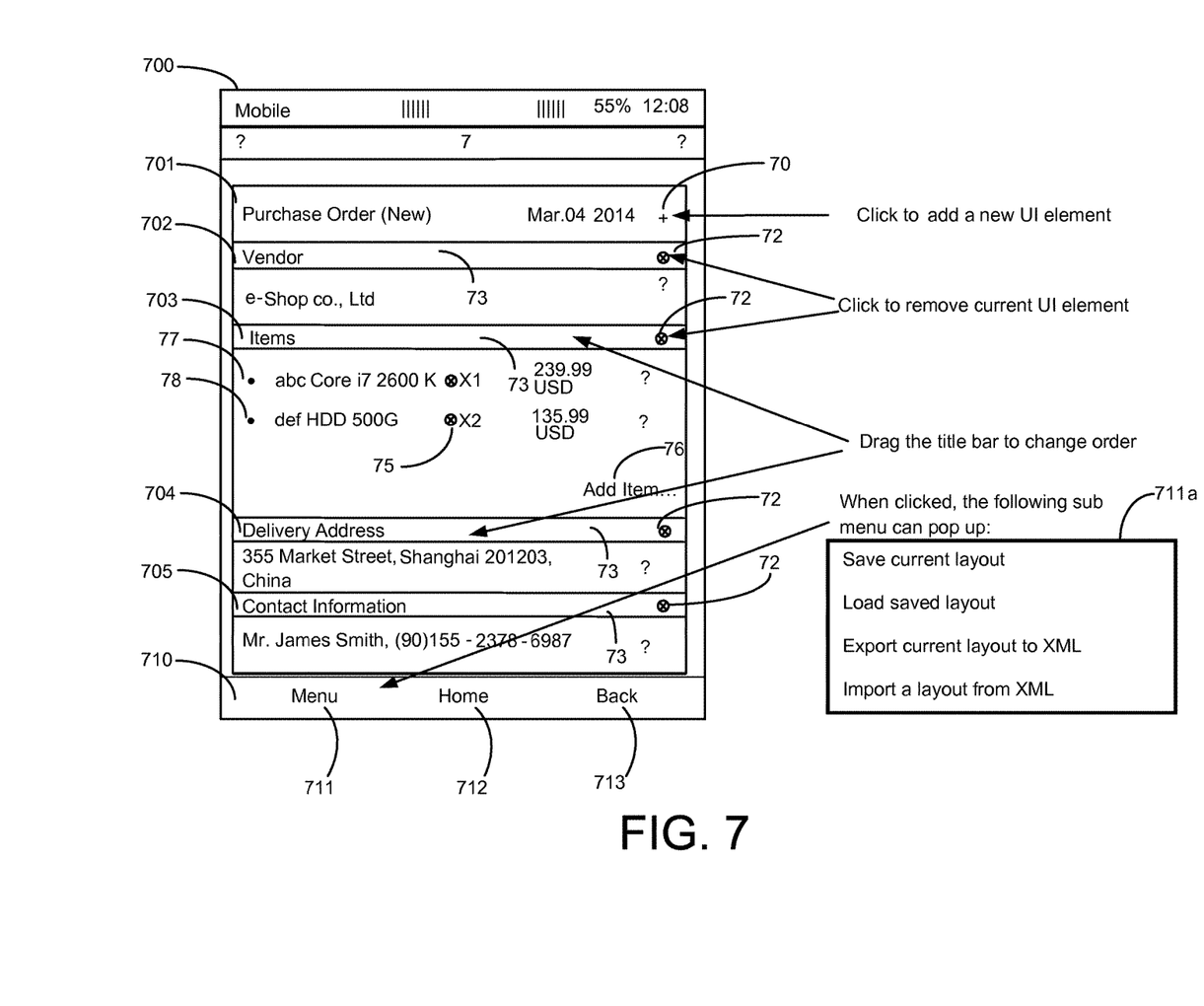
FIG. 7 is an illustration of an example predefined UI layout for an interactive business application user interface, which is user customizable under a dynamic binding framework, in accordance with the principles of the present disclosure.

FIG. 7 shows an example predefined UI layout 700 for an interactive user interface, which is user customizable under the dynamic binding framework, in accordance with the principles of the present disclosure. Example UI layout 700 may be a predefined UI layout for an interactive user interface for a mobile device client application (e.g., client application 112b) on a mobile device (e.g. smartphone 150).

UI layout 700 may, for example, be designed to display a purchase order of an ERP system business application (e.g., business application 112).

Example UI layout 700 may include, for example, a header bar 700 and a toolbar 710 (including user-activable buttons "Menu" 711, "Home" 712, "Back" 713, etc.). Data from static data sources (e.g., predefined text such as "Menu") may, for example, be loaded during development time on to UI layout 700 to annotate header bar 700 and a toolbar 710.

UI layout 700 may also include an arrangement of UI elements (e.g., UI elements "Purchase Order" 701, "Vendor" 702, "Items" 703, Delivery Address" 705) that are configured to display or express purchase order data. These UI elements (e.g., elements 701-705) may be bound to server-side dynamic data sources in the ERP system business application to express or display live purchase order data in runtime. For example, UI element Items 703 may display a list of current items 77 and 78 in the purchase order.

Figure 8:
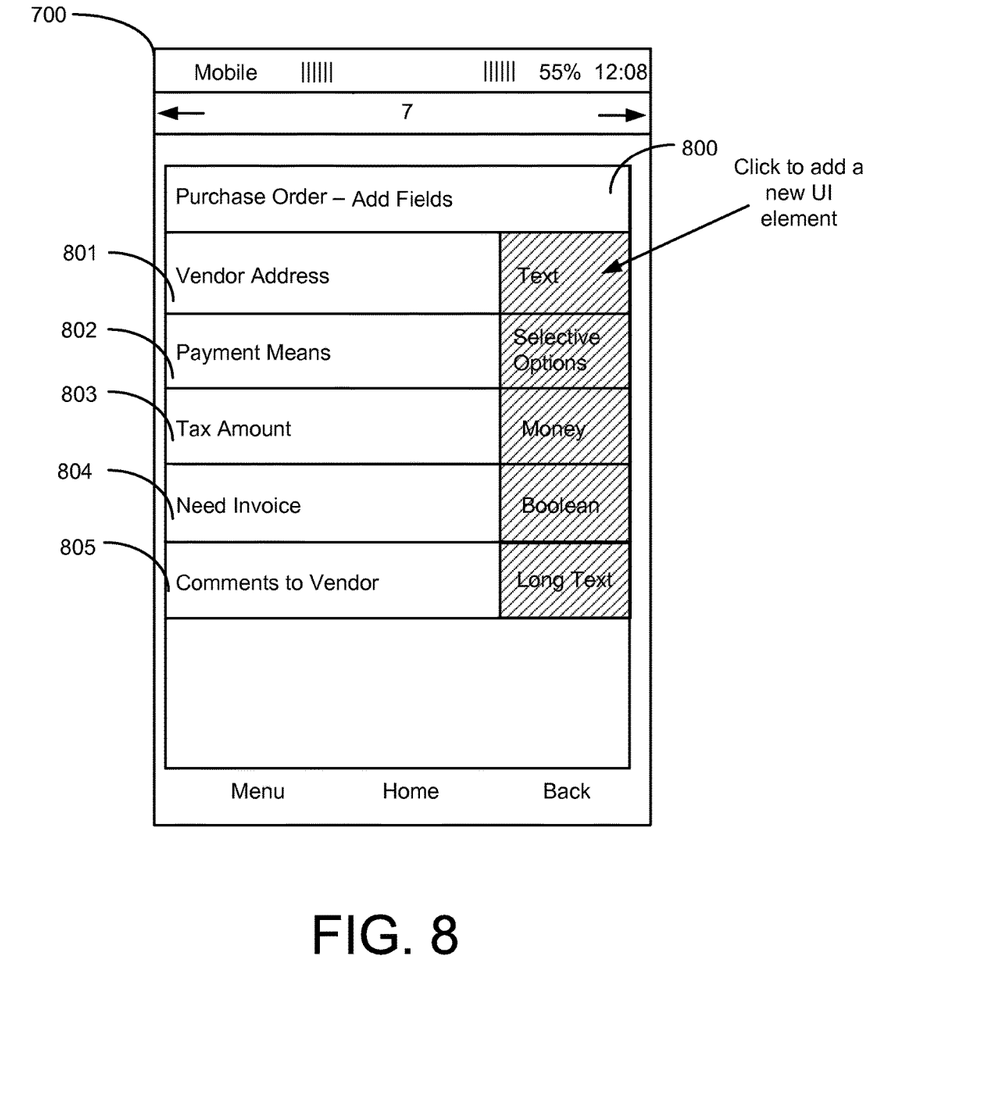
FIG. 8 is an illustration of an example list of available data source-data type pairs in the context of the purchase order shown in FIG. 7, in accordance with the principles of the present disclosure.

UI layout 700 may further include interactive features or mechanisms to enable a user to further edit or customize UI layout 700. The interactive features or mechanisms may include features for adding new UI elements to UI layout 700. For example, UI layout 700 may include a user-activable button 70 to add a new UI element to the layout. When user-activable button 70 is activated, the client application (e.g., utilizing process 500 or process 600) may query the server (e.g., server 110) for data sources that are available for display in the current context or state of the business application, and for the data types of the available data sources. The client application may, for example, present a list of these data sources and data types, which are available for display in the current context or state of the business application, to the user for selection. FIG. 8 shows, for example, such a list 800 of available data source-data type pairs (e.g., Vendor Address-Text 801, Payment Means-Selective Options 802, Tax Amount-Money 803, Need Invoice-Boolean 804, Comments to Vendor-Long Text 805, etc.) in the context of the purchase order shown in FIG. 7.

Figure 9:
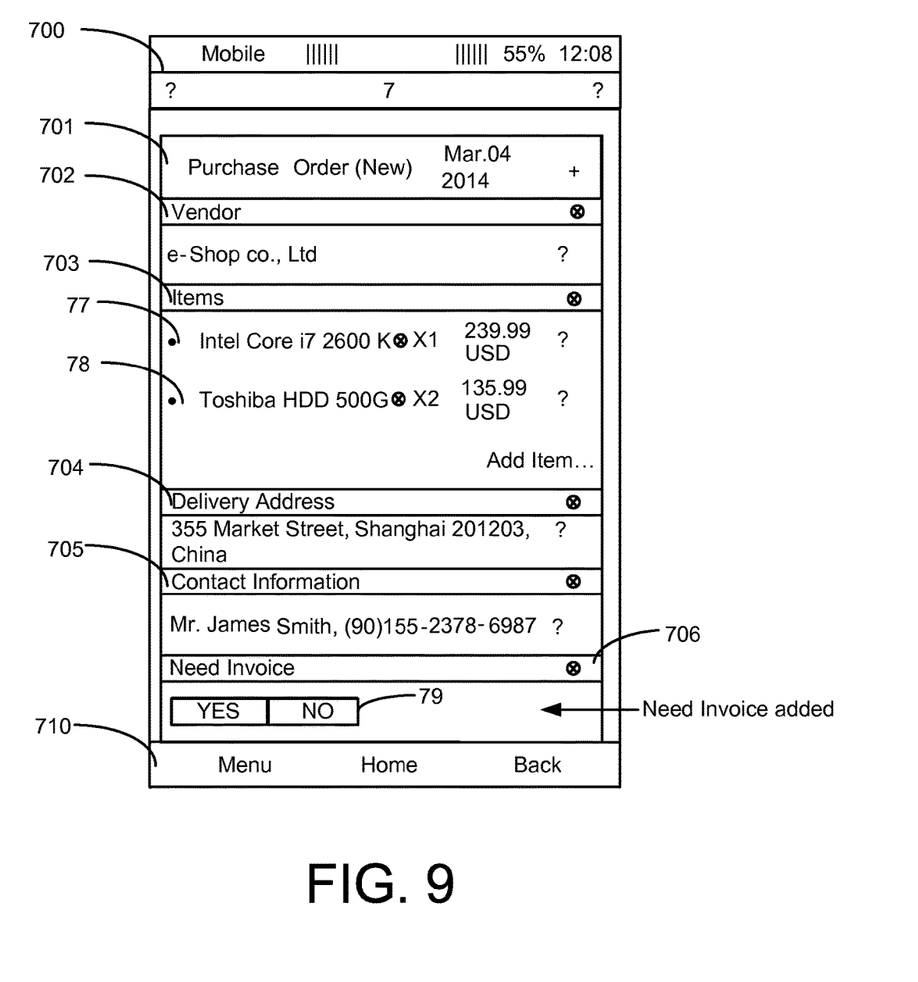
FIG. 9 is an illustration of the predefined UI layout of FIG. 7, which has been after user customized to include an additional UI element, in accordance with the principles of the present disclosure.

A user wanting to display additional purchase order information on user interface 700 may, for example, click on an available data source-data type pair (e.g., "Need Invoice-Boolean 804") in list 800. In response, the client application may determine an UI element type, which maps (e.g., in TABLE 1) to the "Boolean" data type in list 800 selected by the user, and create and dynamically bind a compatible UI element (e.g., UI element 706, which includes a "yes/no" indicator under a header "Need Invoice", FIG. 9) to the "Need Invoice" data source in list 800 selected by the user. Next, the client application may query the server (e.g., server 110) to retrieve the data from the user-selected data source "Need Invoice" for display in UI element 706 on user interface 700. As shown in FIG. 9, UI element 706, which may express the data retrieved from the user-selected data source "Need Invoice", may be positioned below the existing UI elements 701-705 on user interface 700.

In addition to features for adding new UI elements (e.g., button 70, FIG. 7), UI layout 700 may include features for deleting or modifying existing UI elements. For example, one or more of the UI elements (e.g., elements 701-705) may include title bars (e.g., title bars 73), which can be used to drag the UI elements to different positions across UI layout 700. Further, for example, UI layout 700 may include delete buttons or icons 72 associated with each of UI elements 701-705, which the user can activate to delete individual UI elements from UI layout 700. UI layout 700 may further include buttons or icons (e.g., delete button 75, add item icon 76, etc.) that the user can activate to modify portions of data displayed within in an UI element. For example, delete buttons 75 provided in UI element Items 703 may be used to delete individual items 77 and/or 78 that are listed in UI element Items 703. Further, add item icon 76 in UI element Items 703 may be used to display additional items in UI element Items 703. It will understood that to display the additional items in UI element Items 703, the client application may dynamically bind data sources containing information on the additional items to UI element Items 703.

As previously noted, UI layout 700 may be saved, imported from or exported to other devices using, for example, XML files. For this purpose, user-activable button Menu 711 in UI layout 700 when activated may display a sub-menu 711*a* (FIG. 7) which may provide options to, for example, save the current layout, load a saved layout, export the current layout to XML, or import a layout from XML.

Changes to the Data Sources

For business application software products having a long life cycle, changes to the business application data sources are inevitable (e.g., because of vendor product updates or evolving use environments). The changes may include addition of new data sources or modification of existing data sources. For example, a data source/database table may have to be expanded to include more data fields to include additional fields, or the types of data fields in the data table may have to be changed to accommodate changes in software functionality.

Under the static binding framework for UI elements, changes to the data sources on the server-side require corresponding changes to the software code of the client application so that data fields the changed data sources can be properly displayed on the user interface. For example, a change of type of an existing data field may cause the corresponding statically bound UI element to work improperly (e.g., a check box for Boolean values may receive a character 'U' instead of 'Y' or 'N' from the changed data field). Thus, it may be necessary to recode the client application with new UI element types/UI elements to match the changed data sources.

However, under dynamic data binding framework, it may not be necessary to recode the client application. Under dynamic data binding framework, as described above with respect to FIGS. 5 and 6), the client application can query the server for all available server-side data sources and their respective data types (new, changed or unchanged). In the case where a data source and data type are new, the client application can still map the new data type to a compatible UI element type/UI element (e.g., using Table I) and dynamically bind the new data source the compatible UI element type/UI element. A change to the data type of a known or previously bound data source (e.g. a change to a table data field type) may be detected when the client application queries the data source for data. If there is mismatch between the data type expected and the data type returned by the server, the client application can then query the changed data source for the new data type and re-bind the changed data source to a new compatible UI element type/UI element.

The client application may dynamically bind the compatible UI elements to the new or changed data sources and use the compatible UI elements in the user interface to properly display data retrieved from the new or changed data sources. Thus, there may be no need to recode the client application with new UI element types/UI elements to match the new or changed data sources.

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for customizing a user interface of a server-side business application on a client device at a runtime of the server-side business application, the method comprising:
   querying, by a client application on the client device, the server-side business application for explicit identification of a data type of an available data source as being one of integers, Booleans, characters, floating-point numbers, complex numbers, text, alphanumeric strings, arrays, and matrices;
   mapping, by the client application, the identified data type of the available data source to a user interface (UI) element type capable of displaying data of the identified data type of the available data source;
   selecting, by the client device during the runtime of the server-side business application, mapped UI element types that are compatible with data types of user-selected data sources for display on the client device;
   loading, by the client device during the runtime of the server-side business application, an UI element of a selected mapped UI element type in a runtime user interface of the server-side business application on the client device to customize the runtime user interface of the server-side business application on the client device;
   dynamically binding the loaded UI element to the available data source during the runtime of the server-side business application, by the client device, without further individual customization for the loaded UI element;
   querying the server-side business application to retrieve data from the available data source for the loaded UI element; and
   displaying the retrieved data via the loaded UI element in the runtime user interface of the server-side business application on the client device.

2. The method of claim 1, wherein querying the server-side business application for information on an available data source in a current context of the business application includes querying the server-side business application for all data sources available for display in the current context or state of the business application, and for the data types of all such data sources.

3. The method of claim 2, further comprising, presenting a list of all the data sources available for display in the current context or state of the business application on the user interface of the client device as user-selectable data sources for display.

4. The method of claim 3, wherein mapping the data type of the available data source to an UI element type includes mapping the data type of a user-selected data source to the UI element type.

5. The method of claim 4, wherein loading the UI element of the mapped UI type in the user interface of the business application on the client device includes loading an UI element having the UI element type mapped to the data type of the user-selected data source.

6. The method of claim 1 further comprising providing user-activable features on the user interface that are user-activable to add, modify, delete, or move an UI element on the user interface.

7. The method of claim 1, further comprising, importing or exporting an UI elements layout of the user interface as a XML file.

8. A non-transitory computer readable storage medium having instructions stored thereon, including instructions which, when executed by a microprocessor, cause a client computing device to provide a runtime user interface to a server-side business application by:
- querying, by a client application on the client device, the server-side business application for explicit identification of a data type of an available data source as being one of integers, Booleans, characters, floating-point numbers, complex numbers, text, alphanumeric strings, arrays, and matrices;
- mapping, by the client application, the identified data type of the available data source to a user interface (UI) element type capable of displaying data of the identified data type of the available data source;
- selecting, by the client device during the runtime of the server-side business application, mapped UI element types that are compatible with data types of user-selected data sources for display on the client device;
- loading, by the client device during the runtime of the server-side business application, an UI element of a selected mapped UI element type in the runtime user interface of the server-side business application on the client device to customize the runtime user interface of the server-side business application on the client device;
- dynamically binding the loaded UI element to the available data source during runtime of the server-side business application, by the client device, without further individual customization for the loaded UI element;
- querying the server-side business application to retrieve data from the available data source for the loaded UI element; and
- displaying the retrieved data via the loaded UI element in the runtime user interface of the server-side business application on the client device.

9. The non-transitory computer readable storage medium of claim 8 wherein querying the server-side business application for information on an available data source in a current context of the server-side business application includes querying the server-side business application for all data sources available for display in the current context or state of the server-side business application, and for the data types of all such data sources.

10. The non-transitory computer readable storage medium of claim 9, wherein the instructions when executed cause the client computing device to provide a list of all the data sources available for display in the current context or state of the business application on the user interface of the client device as user-selectable data sources for display.

11. The non-transitory computer readable storage medium of claim 10, wherein mapping the data type of the available data source to an UI element type includes mapping the data type of a user-selected data source to the UI element type.

12. The non-transitory computer readable storage medium of claim 11, wherein loading the UI element of the mapped UI type in the user interface of the business application on the client device includes loading an UI element having the UI element type mapped to the data type of the user-selected data source.

13. The non-transitory computer readable storage medium of claim 9, wherein the instructions when executed cause the client computing device to provide user-activable features on the user interface that are user-activable to add, modify, delete, or move UI elements present on the user interface.

* * * * *